US009195526B2

(12) United States Patent
Clewley et al.

(10) Patent No.: US 9,195,526 B2
(45) Date of Patent: Nov. 24, 2015

(54) APPLICATION INTEGRATION IN NETWORKED COMPUTING DEVICES

(75) Inventors: Michael Clewley, Waterloo (CA); Josh Lessard, Waterloo (CA); Vladlen Rudenko, Kitchener (CA); Cassidy Gentle, Kitchener (CA); Gerhard Dietrich Klassen, Waterloo (CA); Denver Coneybeare, Kitchener (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 1682 days.

(21) Appl. No.: 12/175,791

(22) Filed: Jul. 18, 2008

(65) Prior Publication Data

US 2010/0017810 A1     Jan. 21, 2010

(51) Int. Cl.
| | |
|---|---|
| *G06F 9/54* | (2006.01) |
| *G06F 13/00* | (2006.01) |
| *G06F 3/00* | (2006.01) |
| *G06Q 10/00* | (2012.01) |

(52) U.S. Cl.
CPC .............. *G06F 9/546* (2013.01); *G06Q 10/00* (2013.01); *G06F 2209/548* (2013.01)

(58) Field of Classification Search
None
See application file for complete search history.

(56) References Cited

U.S. PATENT DOCUMENTS

| | | | | |
|---|---|---|---|---|
| 6,606,649 B1 * | 8/2003 | Schwitters et al. | ............ | 709/206 |
| 6,779,019 B1 * | 8/2004 | Mousseau et al. | ............ | 709/206 |
| 7,269,798 B2 * | 9/2007 | Nonaka et al. | ................ | 715/804 |
| 7,290,034 B2 * | 10/2007 | Budd et al. | .................... | 709/206 |
| 7,565,663 B2 * | 7/2009 | Knight et al. | ................. | 719/318 |
| 7,600,048 B2 * | 10/2009 | Guest | ............................ | 709/250 |
| 7,747,957 B2 * | 6/2010 | Masuda | ........................ | 715/753 |
| 7,912,908 B2 * | 3/2011 | Cai et al. | ........................ | 709/206 |
| 7,953,638 B2 * | 5/2011 | Hofer et al. | ..................... | 705/37 |
| 2001/0054115 A1 * | 12/2001 | Ferguson et al. | ............. | 709/248 |
| 2003/0028606 A1 * | 2/2003 | Koopmans et al. | ........... | 709/206 |
| 2005/0015432 A1 * | 1/2005 | Cohen | ........................... | 709/201 |
| 2005/0064857 A1 * | 3/2005 | Coppinger et al. | ........... | 455/418 |
| 2005/0076085 A1 * | 4/2005 | Budd et al. | ..................... | 709/206 |
| 2009/0031301 A1 * | 1/2009 | D'Angelo et al. | ............ | 717/178 |
| 2009/0138562 A1 * | 5/2009 | Schmulen et al. | ............ | 709/206 |

OTHER PUBLICATIONS

Irina Medvinskaya: "Automating Outlook with Visual Basic" Internet Article, [Online] Sep. 4, 2001, pp. 1-6, XP002497320. Retrieved from the Internet: URL:http://articles.techrepublic.com.com/5100-10678_11-5032717.html>.
Tony Patton: "Easily automate Microsoft Outlook via .NET" Internet Article, [Online], Sep. 6, 2005, pp. 1-4, XP002497328 Retrieved from the Internet: URL: http://articles.techrepublic.com.com/5100-10878-11-5850937.html>.
David Gewirtz: "An Introduction to Outlook Rules" Internet Article, [online], Jun. 2005, XP 002497321 Retrieved from the Internet: URL:/http://www.outlookpower.com/issuesprint/issue200506/00001578.html>.
European Search Report of EP 08 16 0723, dated Sep. 29, 2008.

\* cited by examiner

*Primary Examiner* — H S Sough
*Assistant Examiner* — Phuong Hoang
(74) *Attorney, Agent, or Firm* — Perry + Currier, Inc.

(57) ABSTRACT

The present specification provides application integration in networked computing devices. An embodiment includes a mobile computing device having a message application that includes a programming interface. The mobile computing device also has a second message application that creates a connection with the message application through the programming interface. Messages that are associated with the second message application can be accessed through the message application, with optional invocation of the second message application via the message application.

13 Claims, 10 Drawing Sheets

APPLICATION INTEGRATION IN NETWORKED COMPUTING DEVICES

FIELD

The present specification relates generally to networked computing devices and more particularly relates to integration of applications in such networked computing devices.

BACKGROUND

Networked computing devices, and in particular mobile networked computing devices are maintaining more and more applications. Many of those applications are dedicated to communication functions between those devices. To give some well known examples, voice communications are handled through telephony applications; instant message communications are handled through instant message applications; email communications are handled through email applications. A recent trend is that the same type of communication is carried through different and unique servers which themselves require their own application to be maintained on the mobile computing device. This is resulting in certain device inefficiencies.

DETAILED DESCRIPTION OF THE EMBODIMENTS

Figure 1:
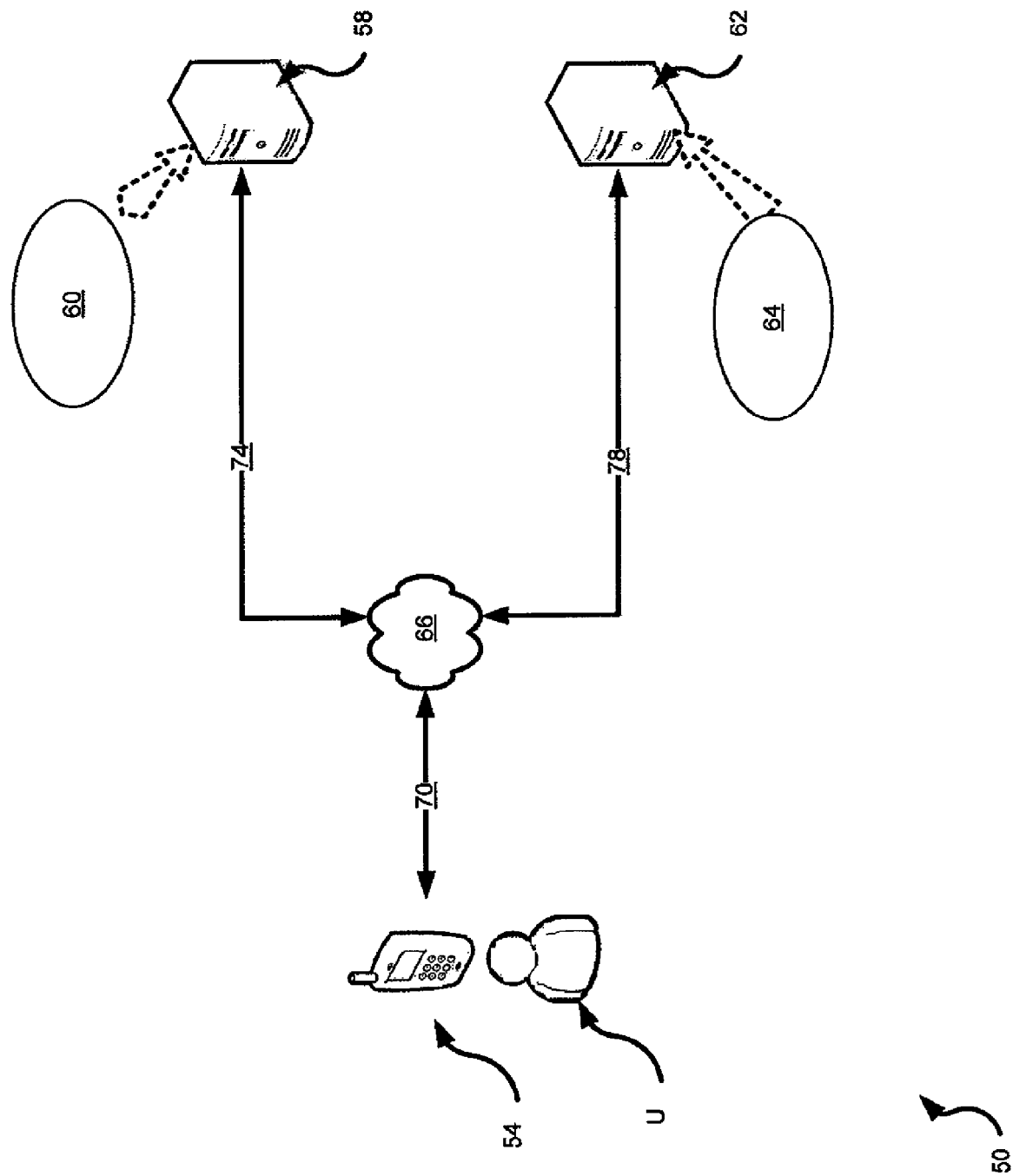
FIG. 1 is a schematic representation of a system for application integration in a networked computing device.

In a first aspect the present specification provides a method of application integration in a networked computing device comprising:

providing an application interface between a message application and a secondary application on the device;

receiving a message associated with the secondary application through the message application;

managing the message via an instruction from the secondary application to the message application via the application interface.

The method can further comprise initially receiving the message via the secondary application and then causing the message to be received through the message application.

The managing can comprise moving the message into a folder within the message application via the instruction.

The managing can further comprise creating the folder within the message application via the instruction prior to the moving.

The managing can comprise identifying the message within the message application as being associated with the secondary application.

The method can further comprise invoking the secondary application from the message application to perform the further action. The method can further comprise, prior to the invoking, determining whether further action from the secondary application is required, and performing the invoking if the further action is required. The message can comprise an electronic indicium and the determining can be based at least in part on the indicium.

The message application can be a primary email application native to the computing device.

The secondary application can be a social networking application.

Another aspect of the specification provides a computing device comprising a network interface for connecting to a network and non-volatile storage configured to maintain a message application and a secondary application and an application interface between the a message application and the secondary application. The computing device further comprises a processor interconnecting the network interface and the non-volatile storage. The processor is further configured to execute the message application such that a message received through the network interface that is associated with the secondary application is processed through the message application.

The processor can be further configured to execute the secondary application such that the message is managed within the message application via an instruction from the secondary application to the message application via the application interface.

The processor can be configured such that the secondary application initially receives the message via the secondary application and then causes the message to be received through the message application.

The processor can be configured to implement the processing by moving the message into a folder within the message application.

The processor can be configured to implement the processing by creating the folder within the message application prior to the moving.

The processor can be configured to delete a folder within the message application.

The processor can be configured to electronically identify the message within the message application as being associated with the secondary application.

The processor can be further configured to perform an invocation of the secondary application from the message application. The processor can be further configured, prior to the invocation, to determine whether further action from the secondary application is required. The message can comprise an electronic indicium and the determining is based at least in part on the indicium.

Another aspect of the specification provides a computer readable storage medium (which can be, by way of non-limiting example, a non-volatile storage device) containing a plurality of programming instructions executable on a processor of a computing device; such that when the programming instructions are executed the computing device is configured to:

provide an application interface between a message application and a secondary application on the device;

receive a message associated with the secondary application through the message application;

manage the message via an instruction from the secondary application to the message application via the application interface.

The present specification provides, amongst other things, an ability for other applications to add application specific folders to a messaging application and to integrate their messaging with email and short message service (SMS) messages via a common interface. Functionality can be implemented to enable non SMS/email applications to create custom folders and store "messages" and custom icons to the handheld messaging application. The applications can specify a type attribute with the message to distinguish various messages. The type attribute can, for example, represent a public chat, a private message, a group discussion and the like.

The message application can be configured so that messages from a particular application are stored to one folder only. Messages are aggregated by the messaging client to display together in a global address list. The message type and status fields are defined by the third party or custom application. For example, a Facebook application from Facebook Inc., can have the following types of messages—private chat, wall message and poke message. A specific icon can be registered for particular message type. The optional status attribute acts similarly, so the application can use both to associate with specific message icon. Applications may mark messages as ineligible for search operations in the messaging client. Additionally, applications can identify which fields are searchable and which ones are not.

Capabilities can be implemented to permit a third party application to register itself with the messaging application to listen for folder events. For example: such folder events can include: a) Message(s) were deleted; b) Message(s) were marked opened; c) Message(s) were marked unopened.

Referring now to FIG. 1, a system for application integration in a networked computing device is indicated generally at 50. In a present embodiment system 50 comprises a first computing device in the form of a client machine 54 and another computing device in the form of a first application server 58 and another computing device in the form of a second application server 62. A network 66 interconnects each of the foregoing components.

Each client machine 54 is typically any type of computing or electronic device that can be used to interact with content available on network 66. Each client machine 54 is operated by a user U. Interaction includes displaying of information on client machine 54 as well as to receive input at client machine 54 that is in turn sent back over network 66. In a present embodiment, client machine 54 is a mobile electronic device with the combined functionality of a personal digital assistant, cell phone, email paging device, and a web-browser. Such a mobile electronic device thus includes a keyboard (or other input device(s)), a display, a speaker, (or other output device(s)) and a chassis within which the keyboard, display monitor, speaker are housed. The chassis also houses one or more central processing units, volatile memory (e.g. random access memory), persistent memory (e.g. Flash read only memory) and network interfaces to allow machine 54 to communicate over network 66. Client machine 54 will be discussed further below.

Server 58 and server 62 can be based on any well-known server environment including a module that houses one or more central processing units, volatile memory (e.g. random access memory), persistent memory (e.g. hard disk devices) and network interfaces to allow servers 58 and 62 to communicate over network 66. For example, server 58 or server 62 or both can be a Sun Fire V480 running a UNIX operating system, from Sun Microsystems, Inc. of Palo Alto Calif., and having four central processing units each operating at about nine-hundred megahertz and having about sixteen gigabytes of random access memory. However, it is to be emphasized that this particular server is merely exemplary, and a vast array of other types of computing environments for servers 58 and 62 are contemplated. In a present embodiment, first application server is a primary message application server 58 that maintains a first server messaging application 60 and second application server 62 is a secondary message application server 62 that maintains a second server messaging application 64, the details of which will be explained further below.

It should now be understood that the nature of network 66 and the links 70, 74 and 78 associated therewith are not particularly limited and are, in general, based on any combination of architectures that will support interactions between client machine 54 and servers 58 and 62. In a present embodiment network 66, itself includes the Internet as well as appropriate gateways and backhauls to links 70, 74 and 78. Accordingly, the links 70, 74 and 78 between network 66 and the interconnected components are complementary to functional requirements of those components.

More specifically, system 50 includes link 70 between client machine 54 and network 66, link 70 being based in a present embodiment on core mobile network infrastructure (e.g. Global System for Mobile communications ("GSM"); Code Division Multiple Access ("CDMA")) or on wireless local area network ("WLAN") infrastructures such as the Institute for Electrical and Electronic Engineers ("IEEE") 802.11 Standard (and its variants) or Bluetooth or the like or hybrids thereof.

System 50 also includes link 74 which can be based on a T1, T3, O3 or any other suitable wired or wireless connected between server 58 and network 66. System 50 also includes link 78 which can be based on a T1, T3, O3 or any other suitable wired or wireless connected between server 62 and network 66.

Figure 2:
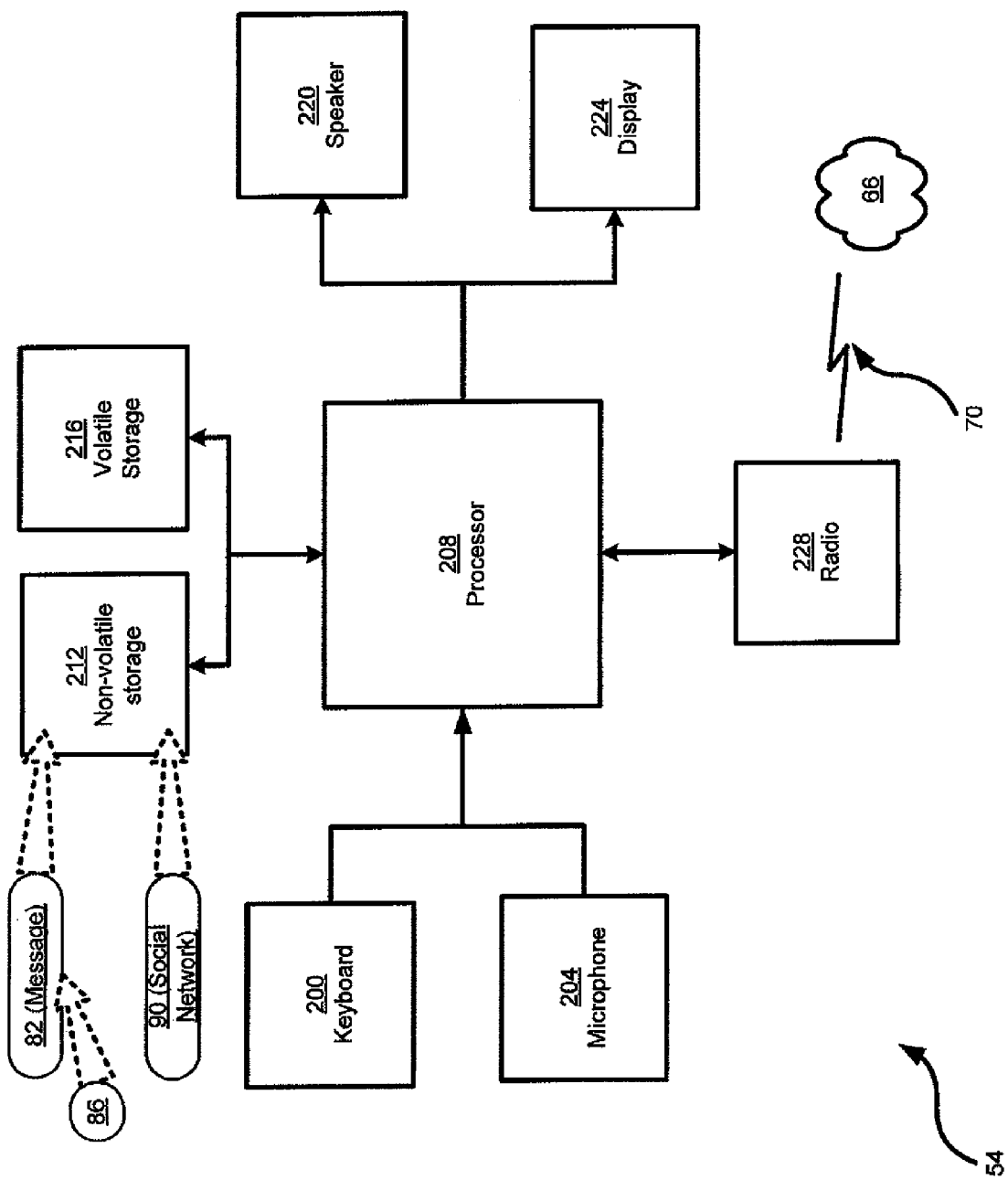
FIG. 2 is a schematic representation of the device of FIG. 1.

Referring now to FIG. 2, a schematic block diagram shows client machine 54 in greater detail. It should be emphasized that the structure in FIG. 2 is purely exemplary, and contemplates a device that be used for both wireless voice (e.g. telephony) and wireless data (e.g. email, web browsing, text) communications. Client machine 54 includes a plurality of input devices which in a present embodiment includes a keyboard 200 and a microphone 204. Other input devices, such as a touch screen, and camera are also contemplated. Input from keyboard 200 and microphone 204 is received at a processor 208, which in turn communicates with a non-volatile storage unit 212 (e.g. read only memory ("ROM"), Erasable Electronic Programmable Read Only Memory ("EEPROM"), Flash Memory) and a volatile storage unit 216 (e.g. random access memory ("RAM"). Client machine 54 also includes a radio 228 connected to processor 208 which operates as a network interface so that client machine 54 can communicate over network 66. Client machine 54 also includes a plurality of output devices which in a present embodiment includes a speaker 220 and a display 224 that are connected to processor 208 and under the control of processor 208.

Programming instructions that implement the functional teachings of client machine 54 as described herein are typically maintained, persistently, in non-volatile storage unit 212 and used by processor 208 which makes appropriate utilization of volatile storage 216 during the execution of such programming instructions. Of particular note is that non-volatile storage unit 212 persistently maintains a message application 82 and a social network application 90, each of which can be executed on processor 208 making use of non-volatile storage 216 as appropriate. Various other applications (not shown) are maintained in non-volatile storage unit 212 according to the desired configuration and functioning of client machine 54.

Message application 82 is configured as a primary application for managing device messages. Message application 82 is configured to primarily interact with primary message application server 58. By way of example, message application server 58 can be an email server that maintains email messages destined for device 54, and manages outbound email messages from device 54. Message application 82 can thus be based on the message application found in a Blackberry™ device from Research in Motion Inc. of Waterloo, Canada, and correspondingly, primary message application server 58 can be based on a Blackberry Enterprise Server (BES) or Blackberry Internet Server (BIS) from Research in Motion Inc. and thus first server message application 60 represents the software applications respective to a BES or a BIS or the like. Message application 82 can also be configured to manage Short Message Service (SMS) messages on behalf of device 54. Message application 82 also includes a programming interface 86 for application integration which will be discussed further below.

Social network application 90 is configured as a secondary application for managing messages. Social network application 90, in a present embodiment, is a stand-alone dedicated application based on the Facebook™ mobile application from Facebook, Inc. of Palo Alto Calif. that can be loaded onto a Blackberry™ device in order to provide a mobile version of the social networking interface provided on a desktop computer via www.facebook.com. In this example, secondary message application server 62 is the server(s) located at www.facebook.com and second server message application 64 is the web-pages associated with www.facebook.com. As will now be apparent to those skilled in the art, the exemplary social network application 90, Facebook™, also has other functions other than managing messages, including the ability to upload photos, maintain and update lists of contacts, posting messages. The teachings herein are not intended to suggest an impingement of those other functions, despite referring to social network application 90 as an application for managing messages.

Figure 3:
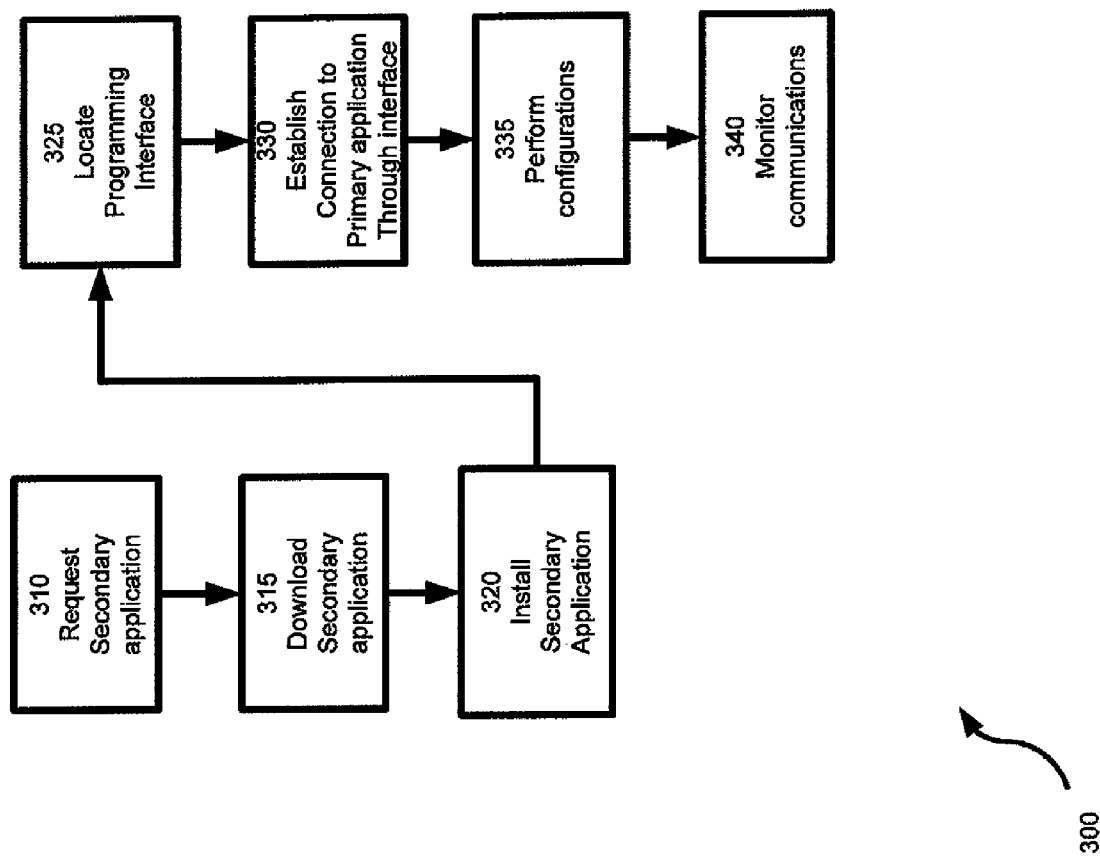
FIG. 3 is a flowchart depicting a method for integrating applications.

Referring now to FIG. 3, a method for integrating applications is depicted in the form of a flowchart and indicated generally at 300. Method 300 can be implemented by device 54 using system 50, but it is to be understood that method 300 or system 50 or both can be varied.

Method 300 presumes that application 90 has not been downloaded or executed onto device 54, and accordingly method 300 describes a method whereby application 90 can be downloaded and executed. Block 310 involves device 54 making a request over network 66 to a server (e.g. server 58 or server 62 or another server not shown,) that hosts a copy of application 90. The request at block 310 requests the download of application 90. Blocks 315 and 320 represent the downloading and installation, respectively, of application 90 onto device 54. FIG. 2 provides a representation of the state of device 54 once blocks 310 through 315 have been completed.

Figure 4:
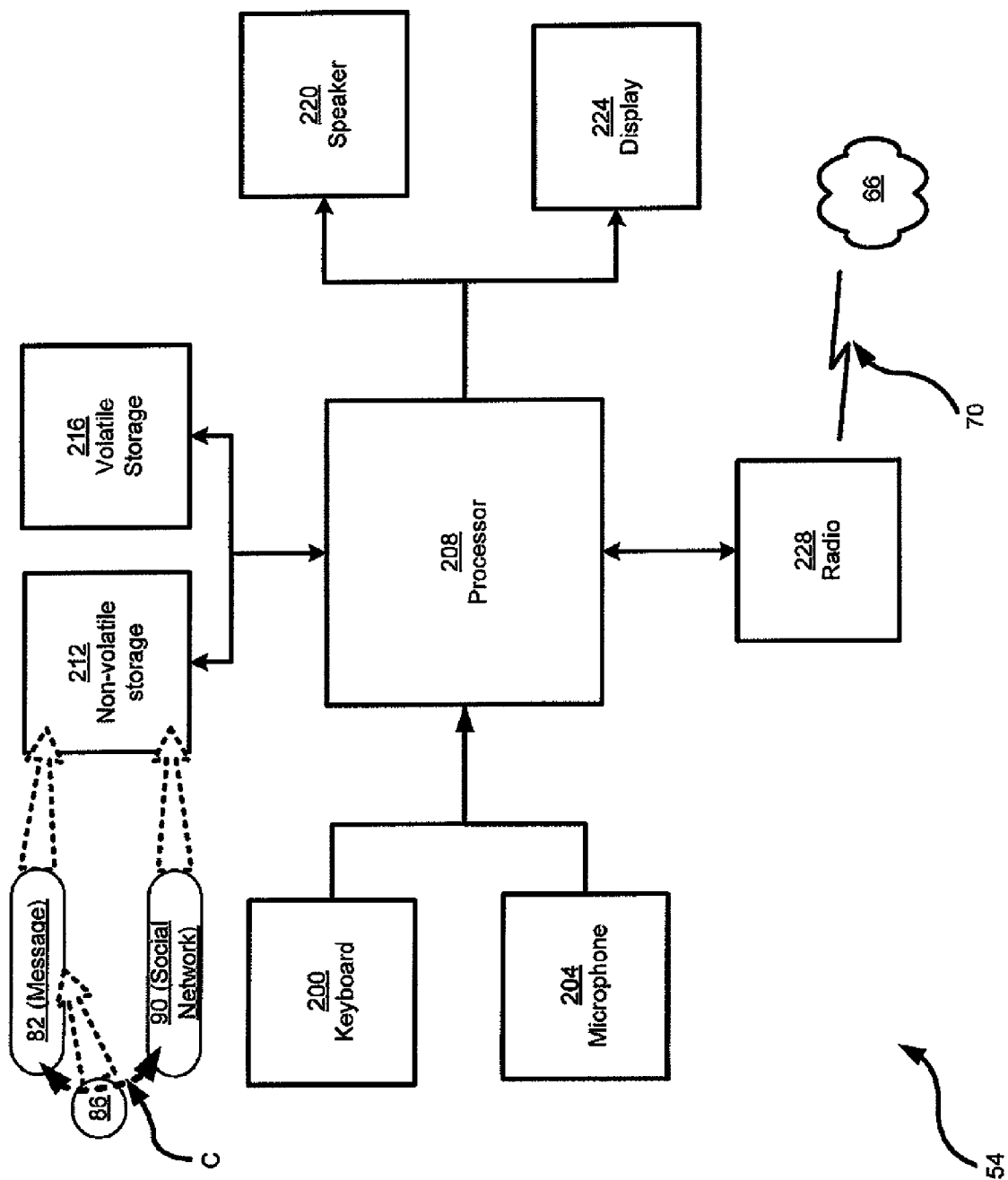
FIG. 4 shows the device of FIG. 2 with a connection established as part of application integration.

At block 325 the programming interface is located. At block 325 application 90 searches device 54 (e.g. via processor 208 and non-volatile storage 212) to locate programming interface 86. Having located programming interface 86, at block 330 application 90 establishes a connection to the primary application through interface 86. FIG. 4 represents the completion of block 330, whereby a virtual connection C is shown between message application 82 and social network application 90 via interface 86 such that social network application 90 can exert certain controls over message application 82. (Note that it can be desired to provide a permission block prior to block 325 so that express permission is required in order to permit social network application 90 to establish connection C and exert control over message application 82). Having established virtual connection C, various controls can be effected, including at block 335 performing certain configurations, including configuring of message application 82.

Figure 5:
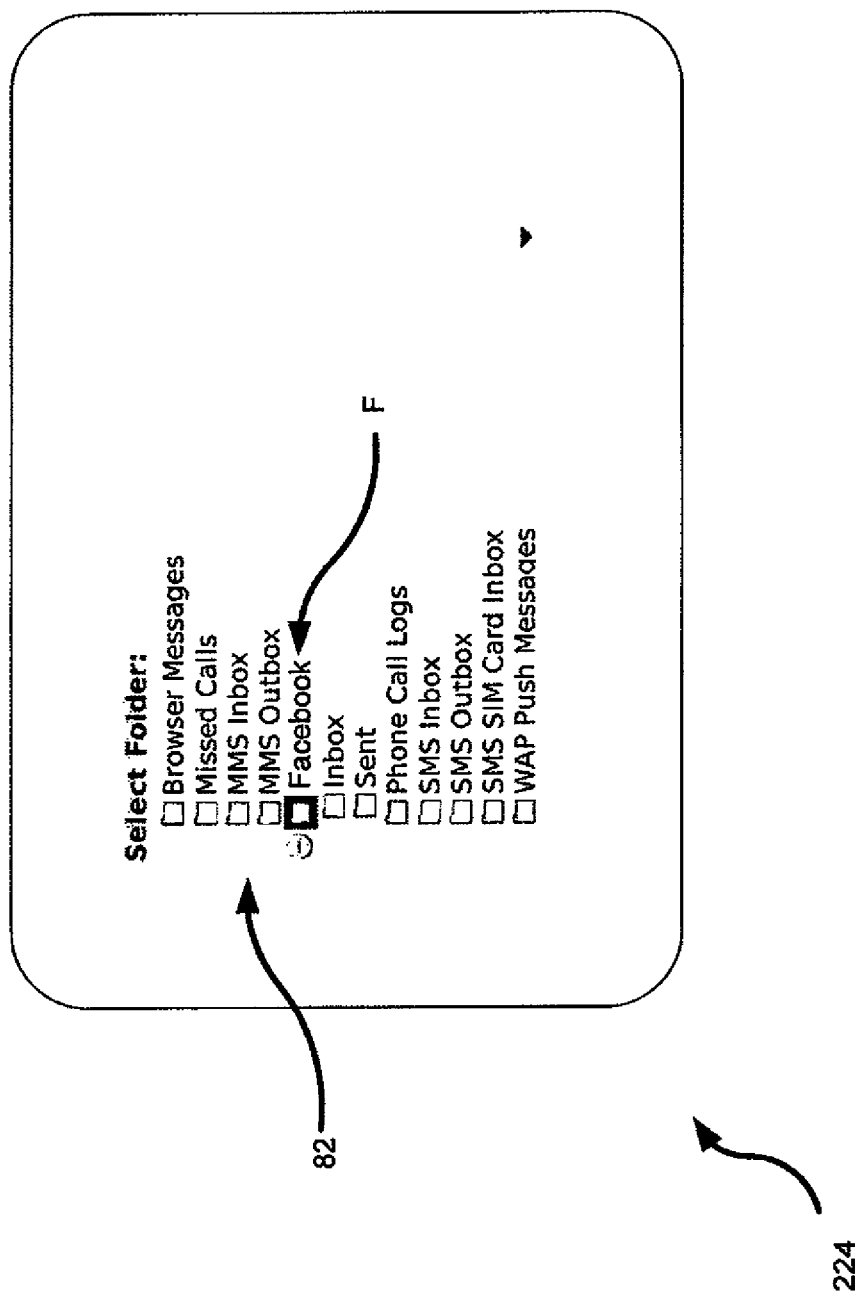
FIG. 5 shows an example screen shot from a message application.

In general, the nature and extent of controls that can be effected via connection C are not particularly limited and will be selected so as to enable the functions within application 90 that can be accomplished via message application 82. Block 335 is an example of such a control. FIG. 5 shows an example of the results of configuring message application 82 via connection C, whereby a "Select Folder" view within message application 82 has been updated to include a new root folder F entitled "Facebook" that includes two sub-folders entitled Inbox and Sent. The creation of root folder F was made, in this example, by application 90 exerting control over message application 82 via connection C.

At block 340, communications are monitored. In the present example application 90 via connection C monitors communications in message application 82 to determine if application 90 needs to take any steps to control application 82 in order to fulfill a particular function of application 90.

Figure 6:
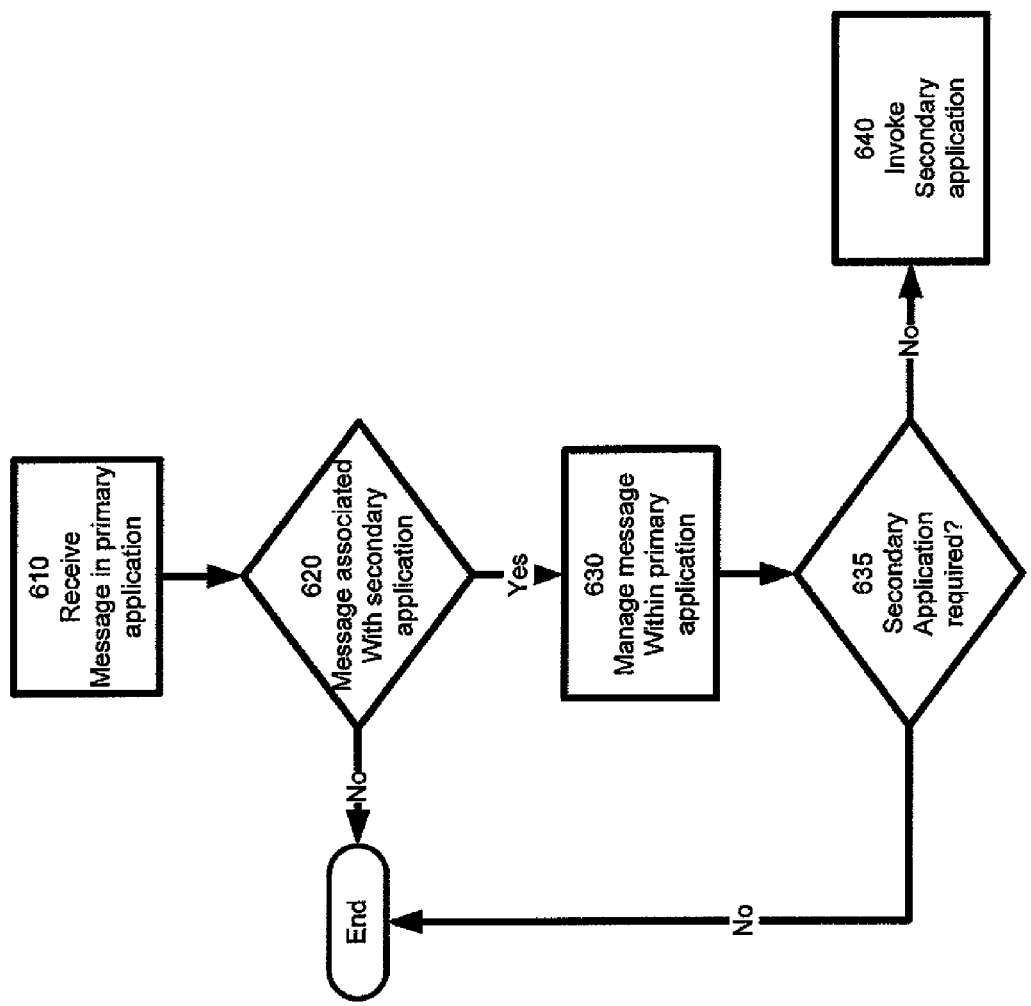
FIG. 6 is a flowchart depicting a method for integrating applications.
Figure 7:
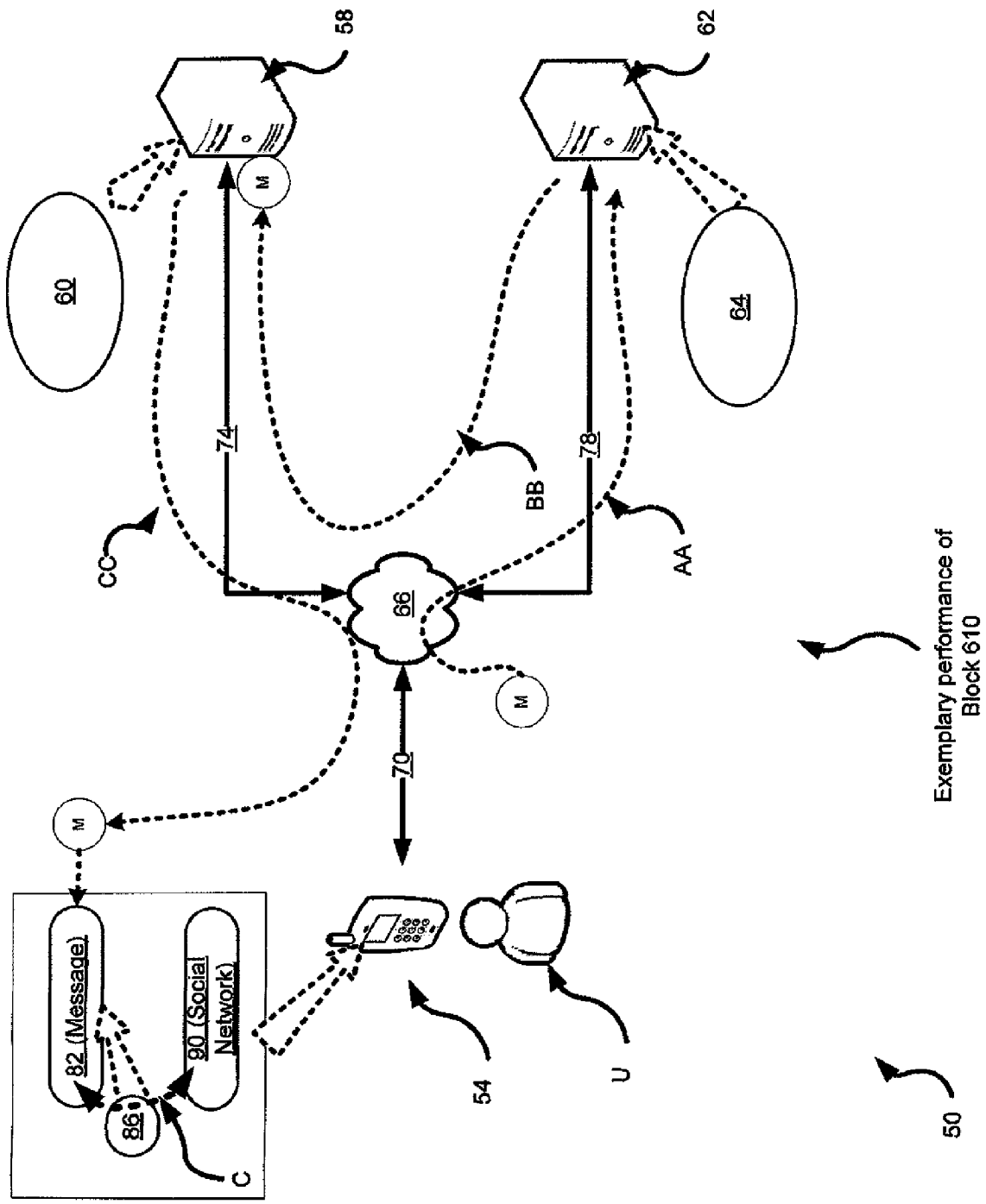
FIG. 7 shows the system of FIG. 1 as part of the performance of the method of FIG. 6.

Other configurations that can be performed at block 335 are contemplated, and can include application 90 sending a notification back to server 62 whereby server 62 becomes aware of the account on server 58 associated with device 54 so that all messages associated with second server message application 64 can be handled through first server message application 60. Where this latter configuration is effected, then block 340 can comprise the monitoring of message application 82 by application 90 to determine if any messages are received at message application 82 that are associated with application 90 and to thereby permit application 90 to take any appropriate action. FIG. 6 provides a flow-chart depicting a method 600 for implementing the foregoing. Block 610 comprises receiving a message in a primary message application. FIG. 7 shows an example of performance of block 610, wherein a message M that is associated with application 64 (and application 90) and intended for device 54 is sent over network 66 to server 62, as represented by arrow AA. Since application 90 has previously indicated to server 62 that messages for application 90 can be handled by message application 82, server 62 will forward message M to application 60 on server 58, as represented by arrow BB. In turn, application 60 on server 58 will handle message M in the usual manner and forward that message M to message application 82 on device 54, as represented by arrow CC. (In an alternative embodiment, not shown, application 64 could forward message M directly from server 62 to application 82 in device 54.)

Referring again to FIG. 6, block 620 comprises determining if the message received at block 610 is associated with the secondary application. Block 620 can be performed by application 90 examining all messages that are received by message application 82 via connection C. A "no" determination at block 620 can result from the examination determining that a particular message is a message of a type that is only handled by server 58 without involvement of server 62. A "yes" determination at block 620 can result from the examination determining that a particular message (e.g. message M) was handled by server 62 (i.e. that message M is associated with application 64). Thus, it will now be apparent that message M includes some form of flag or other indicium that permits the determination made at block 620.

Block 630 comprises managing the message received at block 610 within the primary application. Block 630 is typically performed by application 90. The particular actions or controls effected by application 90 is not particularly limited. One contemplated example of managing the message M includes application 90 accessing application 82 via connection C so as to automatically move message M into the inbox of the folder F labeled Facebook that is shown in FIG. 5. Other controls or actions can be effected by application 90 that correspond to the functions of application 90, as desired.

Block 635 comprises determining whether the secondary application is required. A "no" determination results in method 600 ending. A "yes" determination can be made at block 640 when some aspect or characteristic of message M requires the additional functions associated with application 90. For example, message M may include an attachment or contain a link that can be selected that can only be handled by application 90. Thus, if a "yes" determination is made at block 635, then method 600 advanced to block 640 at which point secondary application 90 is invoked.

Various combinations, subsets, variations of the embodiments are contemplated. For example, secondary application 90 can be part of a web-browser application that is used to read web-mail. The secondary application 90 can be a specialized web-browser application that causes messages to be handled by message application 82 rather than viewing through the web-browser application itself.

Figure 8:
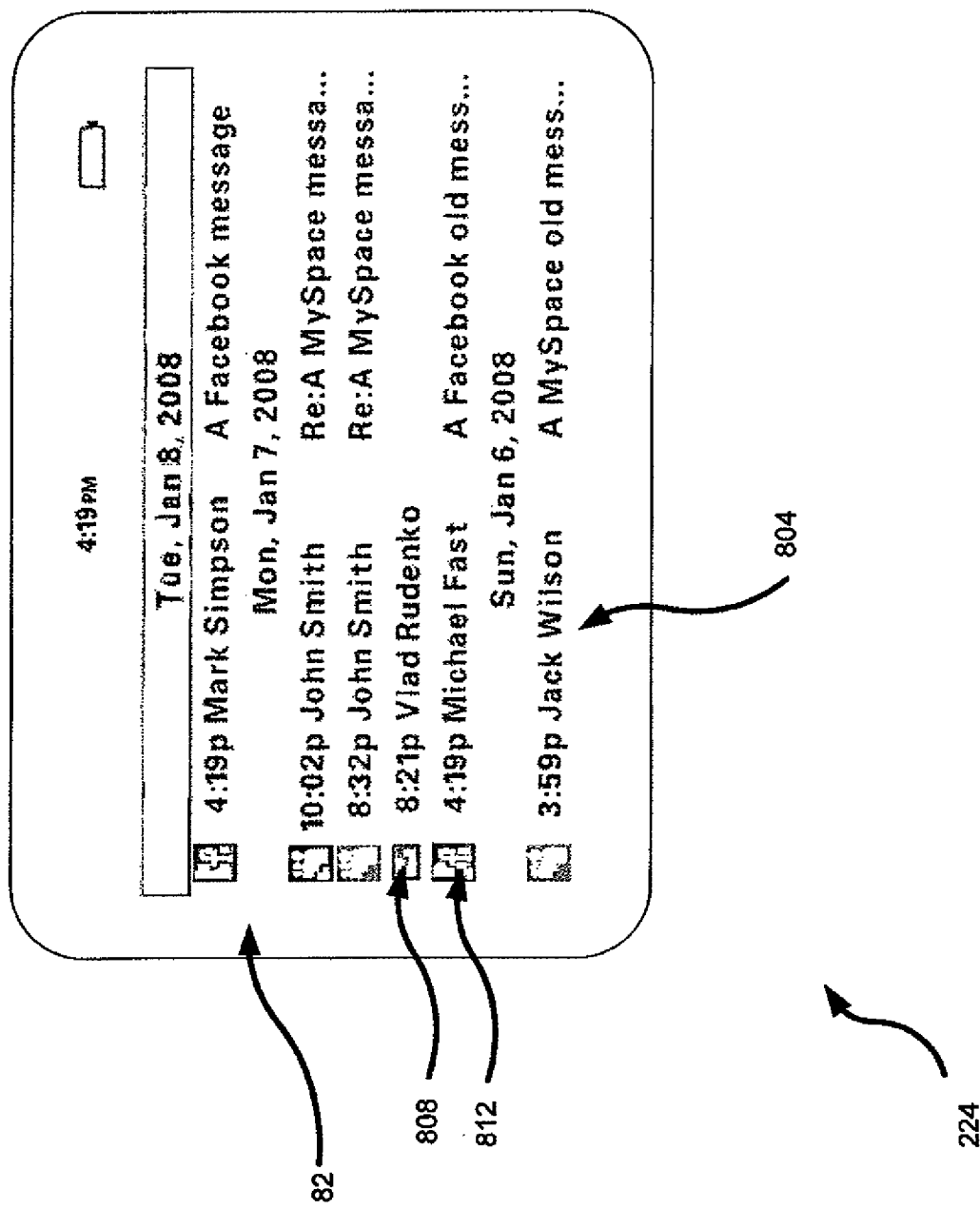
FIG. 8 shows an example screen shot from a message application.

FIG. 8 shows another example of another variation. FIG. 8 shows an exemplary message inbox screen 804 in message application 82 on display 224. Message inbox screen 804 is a global inbox screen that shows all messages that have been received regardless of the type or the folder in which they are placed. Each message includes an icon that identifies the application that is associated with a particular message. Icon 808 shows an envelope icon that is intended to denote that the associated message is associated with application 60, whereas Icon 812 includes a Facebook icon, intended to denote that the associated message is associated with application 64.

As another example of a variation, it is contemplated that device 54 can accommodate a plurality of additional applications like application 90, all of which can use interface 86 in order to form their own connections with message application 82.

Figure 9:
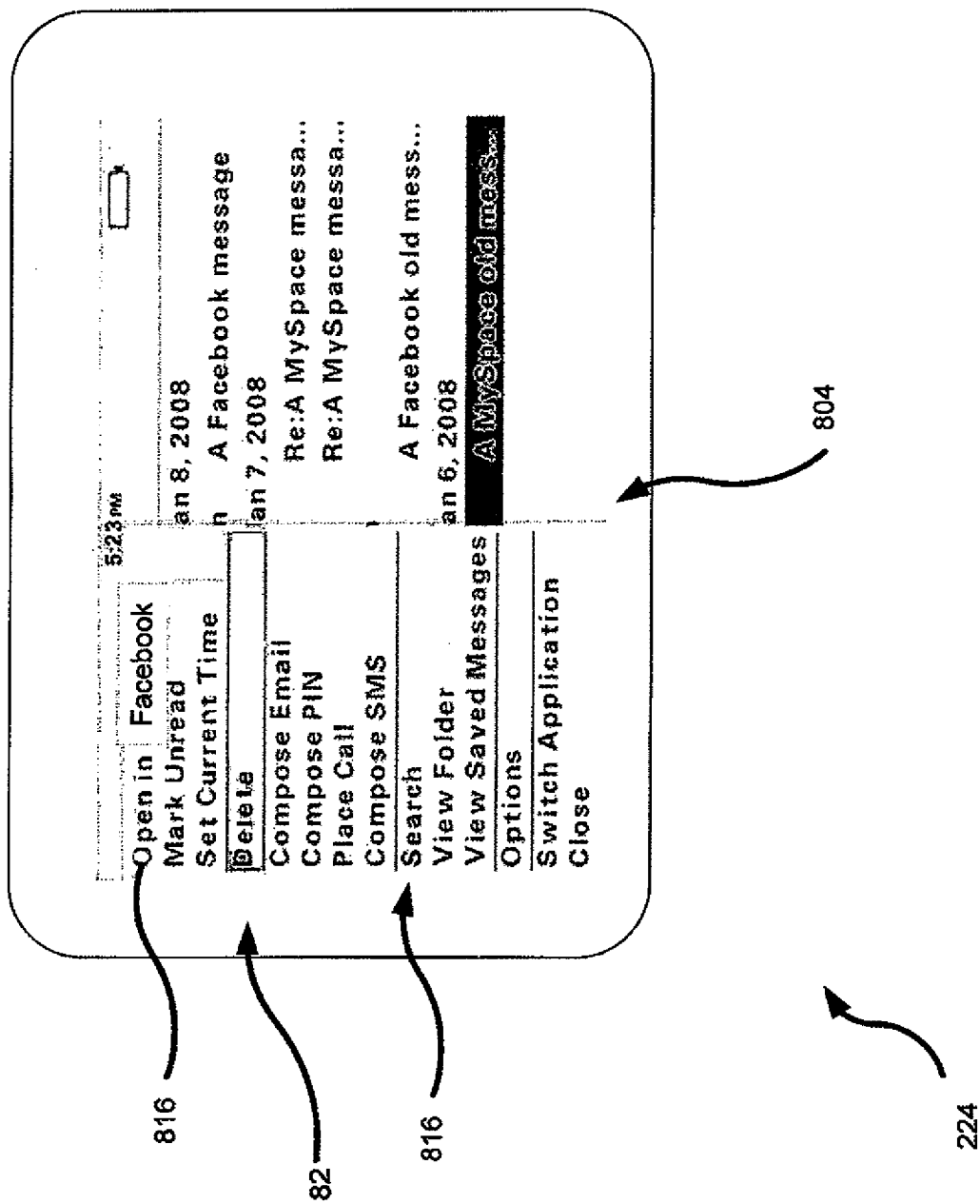
FIG. 9 shows an example screen shot from a message application.

FIG. 9 shows a further example, wherein a context menu 816 is shown on display 224 in association with message inbox screen 804 generated by message application 82. The context menu 816 includes an entry entitled "Open in Facebook" whereby the selected message can be opened using application 90. It will now be apparent that FIG. 9 represents an exemplary performance of blocks 635 and 640 of method 600.

Figure 10:
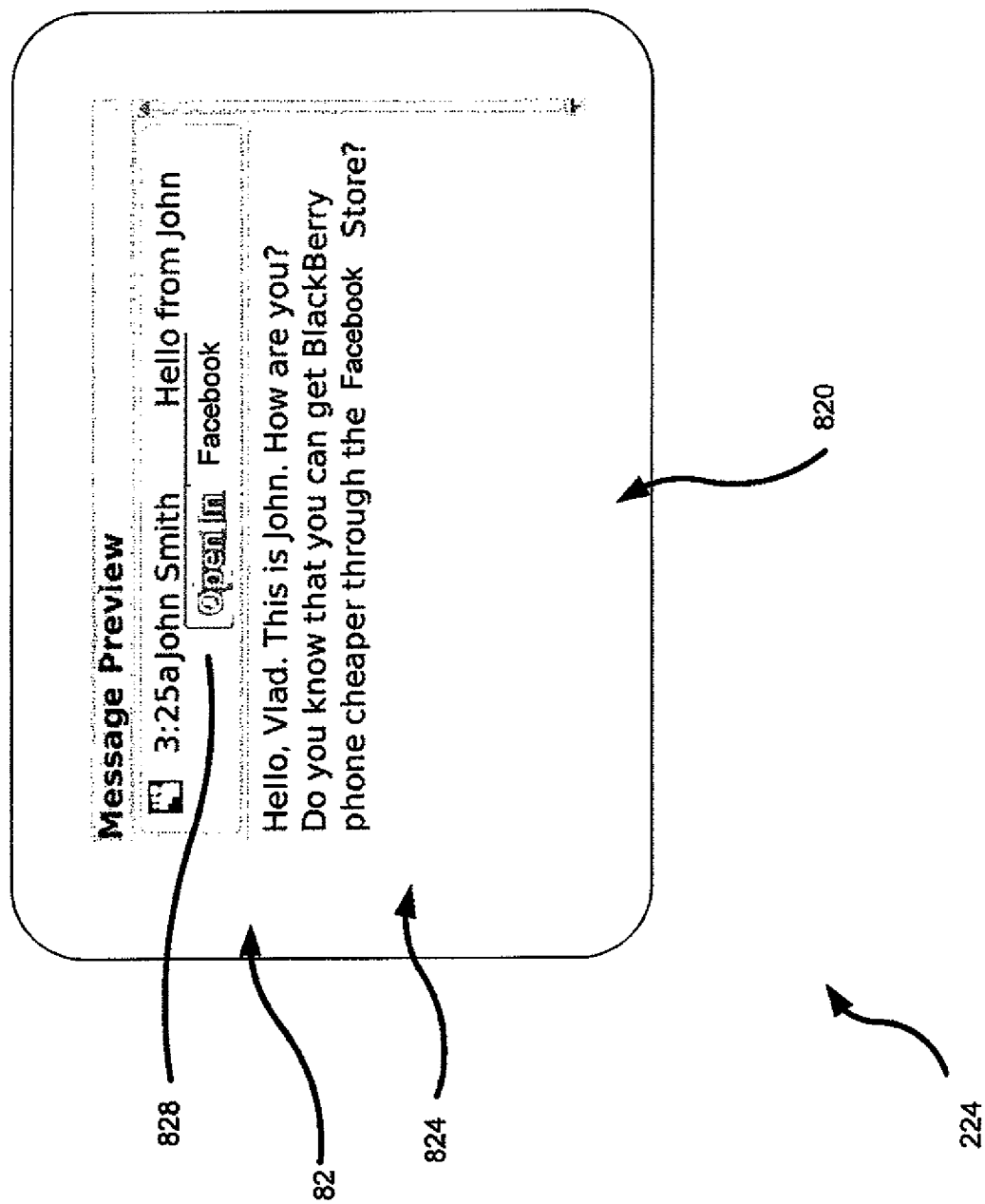
FIG. 10 shows an example screen shot from a message application.

FIG. 10 shows a further example, wherein message application 82 is shown generating a message preview screen 820. Message preview screen 820 comprises a summary of one of the messages in the inbox of message application 82, as well as a status pane that provides particulars of the message as well as a virtual button 828 that can be used to open the message directly in application 90. It will now be apparent that FIG. 10 represents another exemplary performance of blocks 635 and 640 of method 600.

The invention claimed is:

1. A method of application integration in a computing device connected via a network with a primary message server and a secondary message server, the method comprising:
   storing, on said computing device, a primary message application corresponding to said primary message server, and a secondary message application corresponding to said secondary message server;
   providing an application interface between said primary message application and said secondary message application on said computing device;
   executing said secondary message application to send a notification from said computing device to said secondary message server, instructing said secondary message server to direct messages associated with said secondary message application to said primary message server;
   receiving at said computing device, via execution of said primary message application, a message from said primary message server;
   determining at said computing device, via execution of said secondary message application, whether said message includes a flag indicating that said message is associated with said secondary message application;
   when said determination is affirmative, automatically moving said message into a folder within said primary message application, via execution of said secondary message application to send an instruction to said primary message application via said application interface.

2. The method of claim 1 further comprising creating said folder within said primary message application via said instruction prior to said moving.

3. The method of claim 1, further comprising invoking said secondary message application from said primary message application to perform a further action.

4. The method of claim 3 further comprising, prior to said invoking, determining whether further action from said secondary message application is required, and performing said invoking if said further action is required.

5. The method of claim 1 wherein said primary message application is a primary email application native to said computing device.

6. The method of claim 1 wherein said secondary message application is a social networking application.

7. A computing device comprising:
   a network interface for connecting said computing device with a primary message server and a secondary message server via a network;
   non-volatile storage configured to maintain a primary message application, a secondary message application and an application interface between said a primary message application and said secondary message application;
   a processor interconnecting said network interface and said non-volatile storage; said processor configured to:
   execute said secondary message application to send a notification via said network interface to said secondary message server, instructing said secondary message server to direct message associated with said secondary message application to said primary message server;
   execute said primary message application to receive a message from said primary message server via said network interface;
   determine whether said message includes a flag indicating that said message is associated with said secondary message application;

when said determination is affirmative, execute said secondary application to send an instruction to said primary message application via said application interface for automatically moving said message into a folder within said primary message application.

8. The computing device of claim 7, said processor further configured to create said folder within said primary message application prior to said moving.

9. The computing device of claim 7 wherein said processor is further configured to perform an invocation of said secondary message application from said primary message application.

10. The computing device of claim 9 wherein said processor is further configured, prior to said invocation, to determine whether further action from said secondary message application is required.

11. The computing device of claim 7 wherein said primary message application is a primary email application native to said computing device.

12. The computing device of claim 7 wherein said secondary message application is a social networking application.

13. A non-transitory computer readable storage medium containing a plurality of programming instructions executable on a processor of a computing device connected via a network with a primary message server and a secondary message server, for performing a method comprising:

storing, on said computing device, a primary message application corresponding to said primary message server, and a secondary message application corresponding to said secondary message server;

providing an application interface between said primary message application and said secondary message application on said computing device;

executing said secondary message application to send a notification from said computing device to said secondary message server, instructing said secondary message server to direct messages associated with said secondary message application to said primary message server;

receiving at said computing device, via execution of said primary message application, a message from said primary message server;

determining at said computing device, via execution of said secondary message application, whether said message includes a flag indicating that said message is associated with said secondary message application; and when said determination is affirmative, automatically moving said message into a folder within said primary message application, via execution of said secondary message application to send an instruction to said primary message application via said application interface.

* * * * *